(12) United States Patent
Yang et al.

(10) Patent No.: US 11,579,718 B2
(45) Date of Patent: Feb. 14, 2023

(54) TOUCH ELECTRONIC DEVICE

(71) Applicant: InnoLux Corporation, Miao-Li County (TW)

(72) Inventors: Chiu-Lien Yang, Miao-Li County (TW); Kuan-Hung Kuo, Miao-Li County (TW); Chiung-chieh Kuo, Miao-Li County (TW); Jiou-Teng Lai, Miao-Li County (TW); Wen-Yi Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 17/591,215

(22) Filed: Feb. 2, 2022

(65) Prior Publication Data

US 2022/0283658 A1   Sep. 8, 2022

(30) Foreign Application Priority Data

Mar. 2, 2021   (CN) .......................... 202110232386.9

(51) Int. Cl.
*G06F 3/041* (2006.01)

(52) U.S. Cl.
CPC .................................. *G06F 3/0412* (2013.01)

(58) Field of Classification Search
CPC ........... G02F 1/13338; G02F 1/136204; G02F 2202/22; G06F 3/041; G06F 3/0412
See application file for complete search history.

(56) References Cited

U.S. PATENT DOCUMENTS

| | | | |
|---|---|---|---|
| 2009/0147167 A1* | 6/2009 | Park ................... | G02F 1/134363 |
| | | | 349/1 |
| 2017/0192134 A1 | 7/2017 | Hwang et al. | |
| 2017/0242543 A1* | 8/2017 | Chan ...................... | G06F 3/044 |
| 2018/0095324 A1* | 4/2018 | Li ........................... | G06F 3/0412 |
| 2019/0036073 A1* | 1/2019 | Yu .......................... | H01L 27/124 |

FOREIGN PATENT DOCUMENTS

| | | |
|---|---|---|
| CN | 102476490 B | 4/2015 |
| CN | 204667010 U | 9/2015 |
| CN | 105425455 A | 3/2016 |
| CN | 205539836 U | 8/2016 |
| WO | 2018164734 A | 9/2018 |

* cited by examiner

*Primary Examiner* — Robin J Mishler
(74) *Attorney, Agent, or Firm* — Muncy, Geissler, Olds & Lowe, P.C.

(57) ABSTRACT

A touch electronic device is provided, which includes: a display unit; a conductive film disposed on the display unit, wherein the conductive film has a surface impedance ranging from $10^5 \Omega/\square$ to $10^9 \Omega/\square$; and a first polarizer disposed on the conductive film, wherein the conductive film is disposed between the display unit and the first polarizer, wherein a surface impedance of the first polarizer divided by the surface impedance of the conductive film is greater than or equal to $10^3$ and less than or equal to $10^8$.

18 Claims, 3 Drawing Sheets

TOUCH ELECTRONIC DEVICE

CROSS REFERENCE TO RELATED APPLICATION

This application claims the benefits of the Chinese Patent Application Serial Number 202110232386.9, filed on Mar. 2, 2021, the subject matter of which is incorporated herein by reference.

BACKGROUND

1. Field

The present disclosure provides a touch electronic device. More specifically, the present disclosure provides a touch electronic device comprising a film with specific surface impedance design.

2. Description of Related Art

With the advancement of science and technology, all kinds of electronic products are developing towards more intuitive and humanized development. The user can direct send instructions to the touch electronic device by the user's fingers or a stylus to communicate instructions without requiring an additional operating mechanism, making it easier and more convenient to use.

However, with the operating time and the external environment, electrostatic charge will accumulate on the touch panel. If the electrostatic charge cannot be discharged in time, it will affect the display quality of the display panel, and even lead to poor touch or inability to touch. Currently, touch electronic devices on the market usually use a high-impedance conductive film and a conductive polarizer as the antistatic layer, but it may be affected by the external environment, which may cause the conductive polarizer to deteriorate, thereby affecting the display quality.

Therefore, there is an urgent need to provide a touch electronic device with good touch quality and display quality.

SUMMARY

The present disclosure provides a touch electronic device, which comprises: a display unit; a conductive film disposed on the display unit, wherein the conductive film has a surface impedance ranging from $10^5 \Omega/\square$ to $10^9 \Omega/\square$; and a first polarizer disposed on the conductive film, wherein the conductive film is disposed between the display unit and the first polarizer, wherein a surface impedance of the first polarizer divided by the surface impedance of the conductive film is greater than or equal to $10^3$ and less than or equal to $10^8$.

Other novel features of the disclosure will become more apparent from the following detailed description when taken in conjunction with the accompanying drawings.

DETAILED DESCRIPTION OF EMBODIMENT

Figure 1:
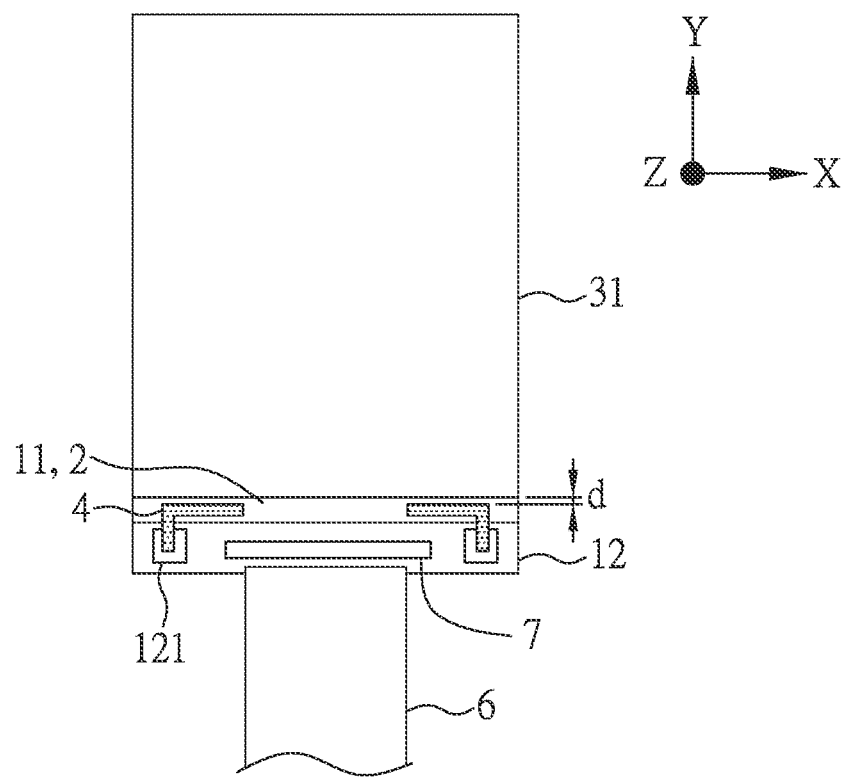
FIG. 1 is a top view of a touch electronic device according to one embodiment of the present disclosure.

The following is specific embodiments to illustrate the implementation of the present disclosure. Those who are familiar with this technique can easily understand the other advantages and effects of the present disclosure from the content disclosed in the present specification. The present disclosure can also be implemented or applied by other different specific embodiments, and various details in the present specification can also be modified and changed according to different viewpoints and applications without departing from the spirit of the present disclosure.

It should be noted that in the present specification, unless otherwise specified, the "one" element is not limited to having a single element, but one or more elements may be provided. Furthermore, the ordinals recited in the specification and the claims such as "first", "second" and so on are intended only to describe the elements claimed and imply or represent neither that the claimed elements have any proceeding ordinals, nor that sequence between one claimed element and another claimed element or between steps of a manufacturing method. The use of these ordinals is merely to differentiate one claimed element having a certain designation from another claimed element having the same designation.

The various aspects disclosed in the present disclosure can be fully understood by the following detailed description and the accompanying drawings. It should be noted that, according to standard practices in the industry, various features are not drawn to scale and are only used for illustration. In fact, it is possible to arbitrarily enlarge or reduce the size of the element to clearly express the features of the present disclosure. In addition, similar and/or corresponding reference numerals may be used in different embodiments, which are only a simple and clear description of some embodiments, and do not represent any connection between the different embodiments and/or structures discussed.

In the specification and the appended claims of the present disclosure, certain words are used to refer to specific elements. Those skilled in the art should understand that electronic device manufacturers may refer to the same components by different names. The present specification does not intend to distinguish those elements with the same function but different names. In the following description and claims, words such as "comprising", "including", "containing", and "having" are open-ended words, so they should be interpreted as meaning "containing but not limited to . . . ". Therefore, when the terms "comprising", "including", "containing" and/or "having" are used in the description of the present disclosure, they specify the existence of corresponding features, regions, steps, operations and/or components, but do not exclude the existence of one or more corresponding features, regions, steps, operations and/or components.

The terms "equal to", "equal" or "same" and "substantially" are generally interpreted as being within 20% of the given value or range, or interpreted as being within 10%, 5%, 3%, 2%, 1% or 0.5% of the given value or range.

In the present disclosure, the unit of the surface impedance is "Ω/□", which refers to the resistance value per unit area, and can also be expressed as "ohm/sq."

In the present disclosure, various measurement methods may be used to measure the surface impedance value, for example, a high resistance meter (model: MCP-HT800) or a surface resistance tester may be used.

In the present disclosure, the thickness, length and width can be measured by an optical microscope, and the thickness can be measured by cross-sectional image obtained by the electron microscope; but the present disclosure is not limited thereto. In addition, there may be a certain error in any two values or directions used for comparison. If the first value is equal to the second value, it implies that there may be an error of about 10% between the first value and the second value. If the first direction is perpendicular to the second direction, the angle between the first direction and the second direction may be ranged from 80 degrees to 100 degrees. If the first direction is parallel to the second direction, the angle between the first direction and the second direction may be ranged from 0 degrees to 10 degrees.

In addition, relative terms, such as "below" or "bottom" and "above" or "top" may be used in the embodiments to describe the relative relationship between one element and another element in the figures. It can be understood that if the device in the figure is turned upside down, the elements described on the "lower" side will become the elements on the "upper" side.

When the corresponding element (such as a film or a region) is disposed "on another element", this element may be directly disposed on the another element, or there may be other elements between the two. On the other hand, when an element is disposed "directly on another element", there is no element between the two. In addition, when an element is disposed "on another element", the two have a vertical relationship in the top view direction, this element can be above or below the another element, and this vertical relationship depends on the orientation of the device.

Furthermore, when a value is in a range from a first value to a second value, the value can be the first value, the second value, or another value between the first value and the second value.

It should be noted that the technical solutions provided by the different embodiments below can be used interchangeably, combined or mixed to form another embodiment without violating the spirit of the present disclosure.

Figure 2:
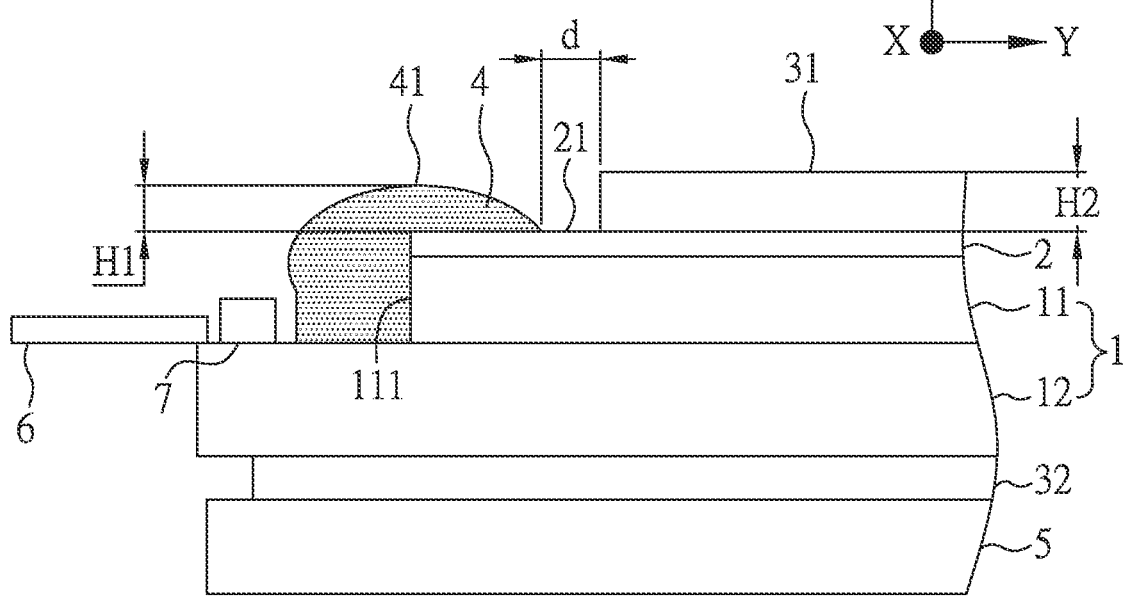
FIG. 2 is a side view of the touch electronic device of FIG. 1.

FIG. 1 is a top view of a touch electronic device according to one embodiment of the present disclosure. FIG. 2 is a side view of the touch electronic device of FIG. 1.

As shown in FIG. 1 and FIG. 2, the touch electronic device of the present disclosure comprises: a display unit 1; a conductive film 2 disposed on the display unit 1; and a first polarizer 31 disposed on the conductive film 2. The display unit 1 of the present disclosure comprises a first substrate 11 and a second substrate 12, and the first substrate 11 is disposed on the second substrate 12. Even not shown in the figure, in some embodiments, the touch electronic device of the present disclosure may further comprise a touch element disposed on one side of the first substrate 11, but the present disclosure is not limited thereto. FIG. 1 shows a direction X, a direction Y and a direction Z. The direction Z may be perpendicular to an upper surface or a lower surface of the first substrate 11 or the second substrate 12. The direction X and the direction Y may be parallel to an upper surface or a lower surface of the first substrate 11 or the second substrate 12. The direction Z may be perpendicular to the direction X and the direction Y, and the direction X may be perpendicular to the direction Y. The spatial relationships of the structures in the subsequent figures can be described according to the direction X, the direction Y, and the direction Z. As shown in FIG. 2, the touch electronic device of the present disclosure further comprises a conductive adhesive 4 disposed on the conductive film 2 and contacting the display unit 1. More specifically, the conductive adhesive 4 is disposed on the conductive film 2 and in contact with the second substrate 12 of the display unit 1 to discharge the accumulated static charge from the conductive pads 121 on the second substrate 12, to achieve the effect of electrostatic discharge, thereby improving the touch sensitivity and accuracy of the touch electronic device.

In addition, even not shown in the figure, the display unit 1 of the present disclosure may comprise plural display units, and the display units may comprise, for example, liquid crystal molecules, organic light emitting diodes (OLEDs), inorganic light emitting diodes (LEDs), mini-LEDs, micro-LEDs, quantum dots (QDs), QLEDs/QDLEDs, electrophoresis materials, fluorescence materials, phosphors, other suitable materials or a combination of the aforesaid materials; but the present disclosure is not limited thereto. In some embodiments, the first substrate 11 may be a color filter substrate, and the second substrate 12 may be a transistor substrate; but the present disclosure is not limited thereto. In addition, the first substrate 11 and the second substrate 12 may be flexible or inflexible substrates, and the material thereof may include plastic, glass, quartz, sapphire, ceramic, carbon fibers, other suitable substrate materials, or a combination of the aforesaid materials; but the present disclosure is not limited thereto. In some embodiments, the aforesaid plastic materials may comprise polyimide (PI), polyethylene terephthalate (PET), polycarbonate (PC), other suitable materials or a combination of the aforesaid materials; but the present disclosure is not limited thereto. In some embodiments, the first substrate 11 may be replaced by an encapsulating layer, which may provide the function of protection, package and/or planarization functions for the display unit. The encapsulating layer may comprise organic materials, inorganic materials, a combination thereof or a mixture thereof; but the present disclosure is not limited thereto. As shown in FIG. 2, the touch electronic device of the present disclosure may selectively further comprise a backlight module 5 disposed under the display unit 1. Even not shown in the figure, the backlight module 5 may comprise several elements, for example, a frame, a light source, a light guide plate, a reflective sheet and an optical film set, and is not described herein.

In the present disclosure, the conductive film 2 has a surface impedance ranging from $10^5 \Omega/\square$ to $10^9 \Omega/\square$. In other words, the surface impedance may be greater than or equal to $10^5 \Omega/\square$, and less than or equal to $10^9 \Omega/\square$; but the present disclosure is not limited thereto. When the conductive film 2 has the surface impedance within the aforesaid range, the conductive effect of the conductive film 2 may be improved, which is beneficial for static discharge or may improve the touch sensitivity. In the present disclosure, the conductive film 2 is disposed on the first substrate 11 of the display unit 1, and between the first polarizer 31 and the display unit 1. Furthermore, in one embodiment of the present disclosure, the conductive film 2 may be directly formed on the first substrate 11. Thus, the area of the conductive film 2 is substantially equal to the area of the first substrate 11, and no other elements are disposed between the conductive film 2 and the first substrate 11 (for example, the conductive film 2 in contact with the first substrate 11), which is beneficial for discharging the accumulated static charge in the display unit 1 and reducing the probability of static charge accumulating in the display unit 1 to improve the touch sensitivity and accuracy of the device.

In the present disclosure, the material of the conductive film 2 may include conductive polymers, transparent conductive oxides, metals, carbon nanotubes, graphene and other inorganic materials or a combination thereof. For example, the material of the conductive film 2 may include poly(3,4-ethylenedioxythiophene (PEDOT), polyaniline (PANI), polyacetylene (PAc), polypyrrole, poly(thiophene) (PT), poly(p-phenylene vinylene) (PPV), polyfluorene (PF), polyphenylene, poly(p-phenylene sulfide) (PPS), indium tin oxide (ITO), indium zinc oxide (IZO), indium trioxide ($In_2O_3$), tin dioxide ($SnO_2$), zinc oxide (ZnO), cadmium oxide (CdO), aluminum zinc oxide (AZO), antimony tin oxide (ATO), silver nanoparticles, gold nanoparticles, silver nanowires or a combination thereof; but the present disclosure is not limited thereto.

In addition, the conductive film 2 may be prepared by various applicable methods, such as dip coating, spin coating, roll coating, blade coating, spray coating, vapor deposition, sputtering, ion-beam assisted deposition or other coating methods; but the present disclosure is not limited thereto. In the present disclosure, the conductive film 2 may have a thickness ranging from 40 nm to 150 nm, from 50 nm to 130 nm, or from 80 nm to 120 nm, for example, about 100 nm; but the present disclosure is not limited thereto. When the conductive film 2 has the thickness within the aforesaid range, the dissipation speed of the signal during touch may be reduced to improve the touch accuracy.

In the present disclosure, the surface impedance of the first polarizer 31 may be greater than or equal to $10^{12}\Omega/\square$, and for example, may be about $10^{13}\Omega/\square$; but the present disclosure is not limited thereto. In the present disclosure, as long as the surface impedance of the first polarizer 31 of the present disclosure falls within the aforesaid range, the first polarizer 31 may be prepared by any material. For example, the first polarizer 31 may be a polarizer that does not contain an antistatic agent. Thus, when using the touch electronic device, the disadvantages of the black spot formation on the display unit 1 or the deterioration of the display quality caused by the antistatic agent precipitation can be prevented. In the present disclosure, the area of the first polarizer 31 is less than the area of the conductive film 2. More specifically, in the normal direction of the display unit 1 (direction Z), the conductive film 2 and the first polarizer 31 are partially overlapped. Thus, the conductive adhesive 4 can be disposed in the region that the conductive film 2 and the first polarizer 31 are not overlapped. The thickness H2 of the first polarizer 31 may be ranged from 40 μm to 150 μm, or from 50 μm to 80 μm, for example, about 54 μm or 77 μm; but the present disclosure is not limited thereto. When the first polarizer 31 has the thickness H2 within the aforesaid range, the first polarizer 31 may have excellent polarization degree and transmittance, and the display quality can further be improved.

In the present disclosure, the touch display device is disposed with the first polarizer 31 and the conductive film 2 with surface impedance ranging from $10^5\Omega/\square$ to $10^9\Omega/\square$. More specifically, the surface impedance of the first polarizer 31 divided by the surface impedance of the conductive film 2 is greater than or equal to $10^3$ and less than or equal to $10^8$. Thus, the touch quality and/or the display quality can be improved.

In one embodiment of the present disclosure, the touch electronic device may further comprise a second polarizer 32 disposed under the display unit 1. More specifically, as shown in FIG. 2, the second polarizer 32 is disposed between the display unit 1 and the backlight module 5. In the present disclosure, the material of the second polarizer 32 may be the same as or similar to the material of the first polarizer 31, and is not described herein.

As shown in FIG. 1 and FIG. 2, the conductive adhesive 4 of the present disclosure is disposed on the conductive film 2 and in contact with the second substrate 12 of the display unit 1, and the conductive adhesive 4 is separated from the first polarizer 31 by a distance d. In one embodiment, when the conductive adhesive 4 is separated from the first polarizer 31 by a distance d, the display quality can be improved, and the risk of polarizer deterioration can be reduced. In another embodiment, the conductive adhesive 4 may be in contact with the first polarizer 31 according to design requirements, and the conductive adhesive 4 and the first polarizer 31 are not overlapped in normal direction of the display unit 1 (direction Z); but the present disclosure is not limited thereto. In one embodiment of the present disclosure, the conductive adhesive 4 may be in contact with a side wall 111 of the first substrate 11, wherein the side wall 111 and the first polarizer 31 are not overlapped in the normal direction of the display unit 1 (direction Z). Thus, the reliability of the conductive adhesive 4 may be improved. In addition, in the normal direction of the display unit 1 (direction Z), there is a maximum thickness H1 between a top surface 41 of the conductive adhesive 4 and an upper surface 21 of the conductive film 2, and the maximum thickness H1 is less than a thickness H2 of the first polarizer 31. Thus, the collision of the conductive adhesive 4 of the obtained touch electronic device in the subsequent assembly process can be reduced to improve the product yield. Herein, the upper surface 21 of the conductive film 2 refers to the surface of the conductive film 2 away from the display unit 1.

In the present disclosure, the material of the conductive adhesive 4 may be a conductive tape or glue containing metal particles and polymers, but the present disclosure is not limited thereto. The metal particles may comprise gold, silver, copper, an alloy thereof or a combination thereof, but the present disclosure is not limited thereto. The polymers may be polypropylene resin or epoxy resin, but the present disclosure is not limited thereto. The shape of the conductive adhesive 4 is not particularly limited, and may be, for example, rectangle, ellipse-like, irregular shape or a shape similar to English uppercase letter "L" or "U"; but the present disclosure is not limited thereto.

The touch electronic device of the present disclosure may further comprise various suitable electronic components. As shown in FIG. 1 and FIG. 2, the touch electronic device of the present disclosure may comprise a circuit board 6 disposed on the second substrate 12. Herein, the circuit board 6 may be a rigid printing circuit board, a flexible circuit board or a combination thereof. In addition, the touch electronic device of the present disclosure may further comprise an integrated circuit 7 disposed on the second substrate 12. In some embodiments, the integrated circuit 7 may be disposed on the circuit board 6. However, the present disclosure is not limited thereto.

Figure 3A:
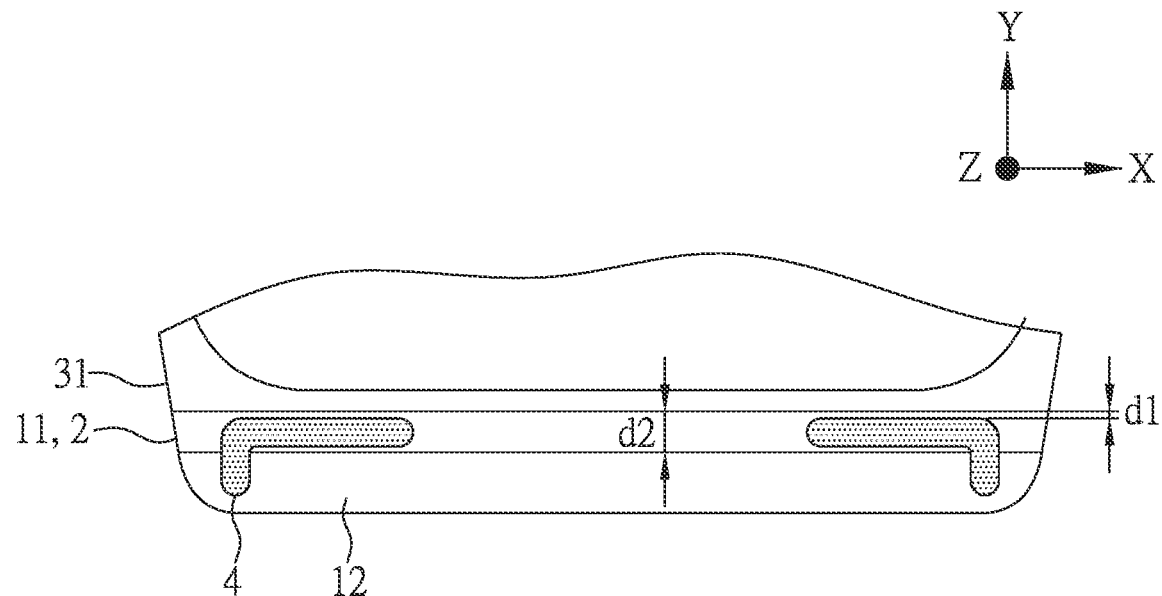
FIG. 3A is a top view of a part of the touch electronic device according to one embodiment of the present disclosure.

FIG. 3A is a top view of a part of the touch electronic device according to one embodiment of the present disclosure, wherein some elements are omitted in FIG. 3A to show the illustrated elements clearly.

In the present embodiment, the conductive adhesive 4 has the shape similar to the English uppercase letter "L", and the conductive adhesive 4 is separated from the first polarizer 31 by a distance d. In other embodiment of the present disclosure, the conductive adhesive 4 may be in contact with the first polarizer 31. As shown in FIG. 3A, in this embodiment and the following other embodiments, the distance d between the conductive adhesive 4 and the first polarizer 31 is the minimum distance as an example. In the normal direction of the display unit 1 (direction Z), there is a first minimum distance d1 between the conductive adhesive 4 and the first polarizer 31, there is a second minimum distance d2 between the first polarizer 31 and the first substrate 11, and the first minimum distance d1 is greater than 0 μm and less than or equal to ⅕ of the second minimum distance d2, i.e. 0 μm<d1≤⅕d2. This design can improve the poor discharge of static charge and improve the touch quality and maintain good display quality. More specifically, the first minimum distance d1 between the conductive adhesive 4 and the first polarizer 31 refers to the first minimum distance d1 between the edge of the conductive adhesive 4 and the edge of the first polarizer 31; and the second minimum distance d2 between the first polarizer 31 and the first substrate 11 refers to the second minimum distance d2 between the edge of the first polarizer 31 and the edge of the first substrate 11.

Figure 3B:
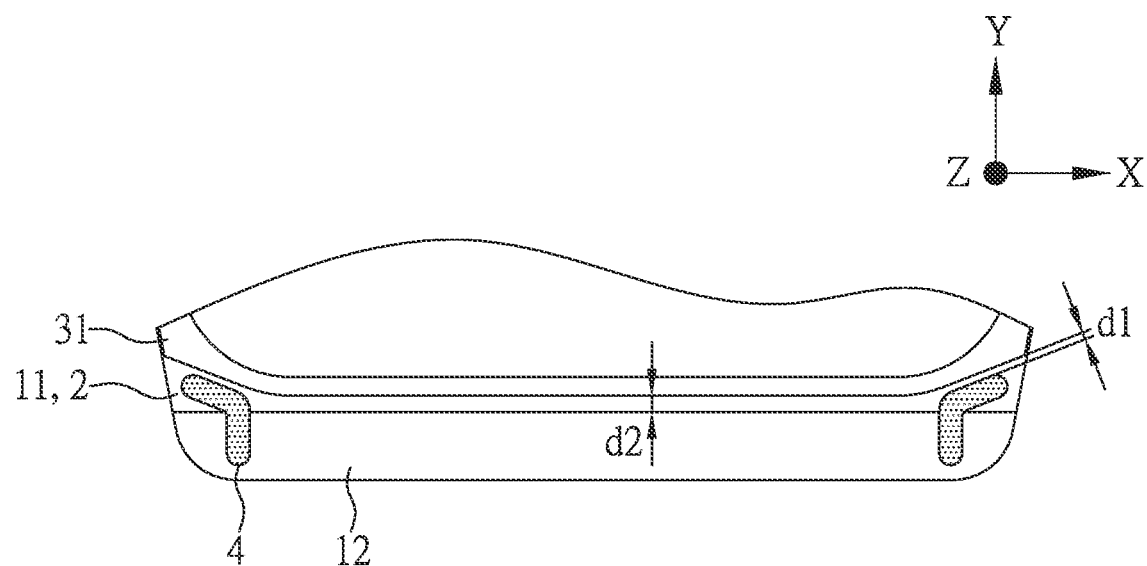
FIG. 3B is a top view of a part of the touch electronic device according to one embodiment of the present disclosure.

FIG. 3B is a top view of a part of the touch electronic device according to one embodiment of the present disclosure, wherein some elements are omitted in FIG. 3B to show the illustrated elements clearly.

In the present embodiment, the first polarizer 31 may have a non-rectangular shape, the conductive adhesive 4 may have the shape similar to the English uppercase letter "L", and the conductive adhesive 4 is separated from the first polarizer 31 by a distance d. In other embodiment of the present disclosure, the conductive adhesive 4 may be in contact with the first polarizer 31. As shown in FIG. 3B, in the normal direction of the display unit 1 (direction Z), there is a first minimum distance d1 between the conductive adhesive 4 and the first polarizer 31, there is a second minimum distance d2 between the first polarizer 31 and the first substrate 11, and the first minimum distance d1 is greater than 0 μm and less than or equal to ⅕ of the second minimum distance d2, i.e. 0 μm<d1≤⅕d2. This design can improve the poor discharge of static charge and improve the touch quality and maintain good display quality.

Figure 3C:
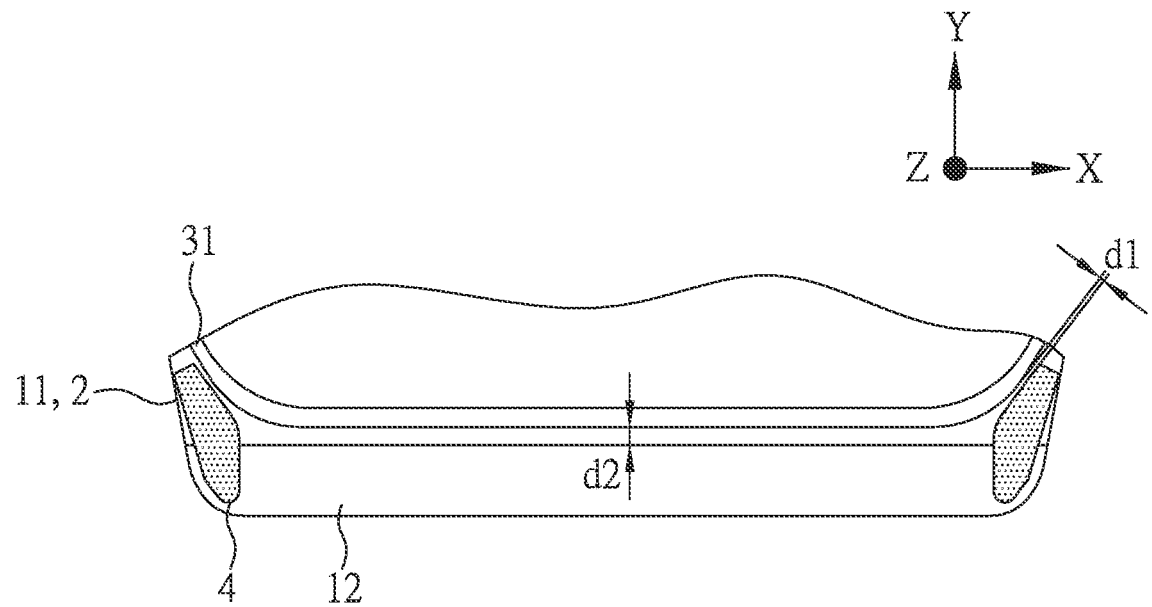
FIG. 3C is a top view of a part of the touch electronic device according to one embodiment of the present disclosure.

FIG. 3C is a top view of a part of the touch electronic device according to one embodiment of the present disclosure, wherein some elements are omitted in FIG. 3C to show the illustrated elements clearly.

In the present embodiment, the first polarizer 31 may have an arc shape, the conductive adhesive 4 may have an irregular shape, and the conductive adhesive 4 is separated from the first polarizer 31 by a distance d. In other embodiment of the present disclosure, the conductive adhesive 4 may be in contact with the first polarizer 31. As shown in FIG. 3C, in the normal direction of the display unit 1 (direction Z), there is a first minimum distance d1 between the conductive adhesive 4 and the first polarizer 31, there is a second minimum distance d2 between the first polarizer 31 and the first substrate 11, and the first minimum distance d1 is greater than 0 pin and less than or equal to ⅕ of the second minimum distance d2, i.e. 0 μm<d1≤⅕d2. This design can improve the poor discharge of static charge and improve the touch quality and maintain good display quality.

Figure 3D:
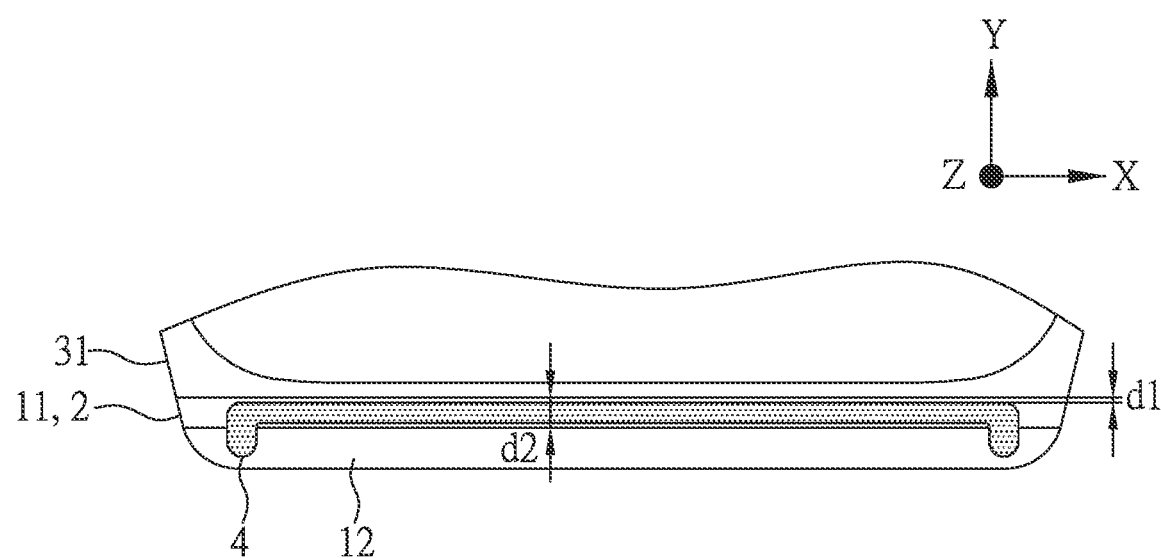
FIG. 3D is a top view of a part of the touch electronic device according to one embodiment of the present disclosure.

FIG. 3D is a top view of a part of the touch electronic device according to one embodiment of the present disclosure, wherein some elements are omitted in FIG. 3D to show the illustrated elements clearly. In addition, FIG. 3D is similar to FIG. 3A, except for the shape difference of the conductive adhesive 4.

In the present embodiment, the conductive adhesive 4 may have the shape similar to the English uppercase letter "U", and the conductive adhesive 4 is separated from the first polarizer 31 by a distance d. In other embodiment of the present disclosure, the conductive adhesive 4 may be in contact with the first polarizer 31. As shown in FIG. 3D, in the normal direction of the display unit 1 (direction Z), there is a first minimum distance d1 between the conductive adhesive 4 and the first polarizer 31, there is a second minimum distance d2 between the first polarizer 31 and the first substrate 11, and the first minimum distance d1 is greater than 0 μm and less than or equal to ⅕ of the second minimum distance d2, i.e. 0 μm<d1≤⅕d2. This design can improve the poor discharge of static charge and improve the touch quality and maintain good display quality.

Although the present disclosure has been explained in relation to its embodiment, it is to be understood that many other possible modifications and variations can be made without departing from the spirit and scope of the disclosure as hereinafter claimed.

What is claimed is:

1. A touch electronic device, comprising:
   a display unit comprising a first substrate;
   a conductive film disposed on the first substrate, wherein the conductive film has a surface impedance ranging from $10^5 \Omega/\square$ to $10^9 \Omega/\square$;
   a first polarizer disposed on the conductive film, wherein the conductive film is disposed between the first substrate and the first polarizer; and
   a conductive adhesive disposed on the conductive film,
   wherein a surface impedance of the first polarizer divided by the surface impedance of the conductive film is greater than or equal to $10^3$ and less than or equal to $10^8$,
   wherein there is a first minimum distance between the conductive adhesive and the first polarizer, there is a second minimum distance between the first polarizer and the first substrate, and the first minimum distance is greater than 0 μm and less than or equal to ⅕ of the second minimum distance.

2. The touch electronic device of claim 1, wherein conductive film and the first polarizer are partially overlapped.

3. The touch electronic device of claim 1, wherein an area of the first polarizer is less than an area of the conductive film.

4. The touch electronic device of claim 1, wherein the conductive adhesive contact the display unit.

5. The touch electronic device of claim 4, wherein the conductive film and the first polarizer are partially overlapped, and the conductive adhesive is disposed in a region that the conductive film and the first polarizer are not overlapped.

6. The touch electronic device of claim 4, wherein the conductive adhesive is a conductive tape or glue containing metal particles.

7. The touch electronic device of claim 4, wherein in a normal direction of the display unit, there is a maximum thickness between a top surface of the conductive adhesive and an upper surface of the conductive film, and the maximum thickness is less than a thickness of the first polarizer.

8. The touch electronic device of claim 4, wherein the display unit comprises a second substrate, the first substrate is disposed on the second substrate, and the conductive adhesive contacts the second substrate.

9. The touch electronic device of claim 8, wherein the conductive adhesive contacts a side wall of the first substrate.

10. The touch electronic device of claim 8, wherein an area of the conductive film is substantially equal to an area of the first substrate.

11. The touch electronic device of claim 8, further comprising a circuit board disposed on the second substrate.

12. The touch electronic device of claim 1, wherein the surface impedance of the first polarizer is greater than or equal to $10^{12} \Omega/\square$.

13. The touch electronic device of claim 1, wherein the first polarizer has a thickness ranging from 40 μm to 150 μm.

14. The touch electronic device of claim 1, wherein the conductive film has a thickness ranging from 40 nm to 150 nm.

15. The touch electronic device of claim 1, wherein the first polarizer is a polarizer that does not contain an antistatic agent.

16. The touch electronic device of claim 1, wherein the conductive film includes conductive polymers, transparent conductive oxides, metals, carbon nanotubes, graphene or a combination thereof.

17. The touch electronic device of claim 1, further comprising a second polarizer disposed under the display unit.

18. The touch electronic device of claim 1, further comprising a backlight module disposed under the display unit.

* * * * *